(12) United States Patent
Pian et al.

(10) Patent No.: US 7,675,969 B2
(45) Date of Patent: *Mar. 9, 2010

(54) ADAPTIVE RATE CONTROL FOR DIGITAL VIDEO COMPRESSION

(75) Inventors: Donald T. Pian, San Diego, CA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 11/350,525

(22) Filed: Feb. 8, 2006

(65) Prior Publication Data

US 2006/0126732 A1 Jun. 15, 2006

Related U.S. Application Data

(63) Continuation of application No. 09/907,153, filed on Jul. 16, 2001, now Pat. No. 7,023,915, which is a continuation of application No. 08/731,229, filed on Oct. 11, 1996, now Pat. No. 6,366,614.

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................. 375/240.02
(58) Field of Classification Search ............ 375/240.01–240.29; 348/419.1
See application file for complete search history.

(56) References Cited

U.S. PATENT DOCUMENTS 5,021,891 A 6/1991 Lee
5,107,345 A 4/1992 Lee
5,189,530 A 2/1993 Fujii (Continued)

FOREIGN PATENT DOCUMENTS

EP 0469835 2/1992

(Continued)

OTHER PUBLICATIONS

Atul Puri et al., "Motion-Compensated Video Coding with Adaptive Perceptual Quantization", IEEE Transactions On Circuits and System for Video Technology vol. 1 No. 4, Dec. 1991, pp. 351-361.

(Continued)

*Primary Examiner*—Nhon T Diep
(74) *Attorney, Agent, or Firm*—Milan Patel; Steven R. Thiel

(57) ABSTRACT

A system and method for adaptively controlling the encoded data rate in a data compression system. The system and method sets up alternative encoded bit streams for each segment of data and selects the alternative that would produce the bit rate closest to a predetermined target bit rate for transmission. Each segment of video input is quantized based on a set quantization settings to produce a plurality of quantized segments. Each quantized segment is then variable rate encoded to produce an alternative encoded bit stream. The data rate that would be required to transmit each alternative encoded bit stream is determined and compared with a predetermined target bit rate, which is set according to the transmission rate buffer status. The selected encoded bit stream is provided to the transmission rate buffer in preparation for transmission. Having processed one segment of data, the system and method then updates its parameters for processing the next segment of data. An updated target bit rate is determined based on the rate buffer status at this point. A rate versus quantization index model is derived according to the data rates of the encoded streams and the corresponding quantization indices. A new set of weighting mask functions is then produced in accordance with the model and the quantization indices. The new set of quantization indices is to be used for processing the next segment of data.

33 Claims, 5 Drawing Sheets

U.S. PATENT DOCUMENTS

| | | | | |
|---|---|---|---|---|
| 5,376,968 | A | * | 12/1994 | Wu et al. ............... 375/240.14 |
| 5,404,168 | A | * | 4/1995 | Yamada et al. .......... 375/240.03 |
| 5,410,352 | A | * | 4/1995 | Watanabe .............. 375/240.03 |
| 5,452,104 | A | | 9/1995 | Lee |
| 5,530,479 | A | * | 6/1996 | Fujihara .................. 375/240.2 |
| 5,543,844 | A | * | 8/1996 | Mita et al. ............... 375/240.2 |
| 5,583,573 | A | * | 12/1996 | Asamura et al. ....... 375/240.04 |
| 5,646,687 | A | | 7/1997 | Botsford, III et al. |
| 5,675,385 | A | * | 10/1997 | Sugiyama ................ 375/240.2 |
| 5,969,764 | A | | 10/1999 | Sun et al. |
| 6,167,088 | A | | 12/2000 | Sethuraman |
| 6,192,075 | B1 | | 2/2001 | Jeng et al. |

FOREIGN PATENT DOCUMENTS

| | | |
|---|---|---|
| EP | 0500077 | 8/1992 |
| EP | 0553361 | 8/1993 |
| EP | 0566219 | 10/1993 |
| EP | 0574244 | 12/1993 |
| JP | 04255190 | 9/1992 |
| JP | 04323960 | 11/1992 |
| JP | 05029248 | 2/1993 |
| JP | 08130479 | 10/1994 |
| JP | 08098175 | 4/1996 |

OTHER PUBLICATIONS

C.A. Gonzales et al., "Motion Video Adaptive Quantization in the Transform Domain", IEEE Transactions on Circuits and System for Video Technology, vol. 1 No. 4., Dec. 1991, pp. 374-385.

Cheng-Tie Chen et al., "A Self-Governing Rate Buffer Control Strategy for Pseudoconstant Bit Rate Video Coding", IEEE Transactions on Image Processing, vol. 2 No. 1, Jan. 1993, pp. 50-59.

Hitomi Murakami et al, "15/30 Mbit/s Universal Digital TV Codec Using a Median Adaptive Predictive Coding Method", IEEE Transactions on Communications, vol. Com-35. No. 6, Jun. 1987, pp. 637-645.

ISO/IEC JTC1 CD 10918, "Digital compression and encoding of continuous-tone still images - part 1: Requirements and guidelines," International Standards Organization, 1994.

Joel Zdepski et al, "Statistically Based Buffer Control Policies from Constant Rate Transmission of Compressed Digital Video", IEEE Transactions on Communications, vol. 39, No. 6, Jun. 1991, pp. 947-957.

Kou-Hu Tzou, "An Intrafield DCT-Based HDTV Coding for ATM Networks", IEEE Transactions on Circuits and System for Video Technology, vol. 1., No. 2., Jun. 1991, pp. 184-196.

Naoki Munkawa et al., "An Interframe Coding System for Video Teleconferencing Signal Transmission at a 1.5 Mbit/s Rate", IEEE Transactions on Communications, Mar. 1984, pp. 280-287.

New References on Video Coding Rate Control, "Possible Referenced for Rate Control Patent", Wednesday, Oct. 23, 1996.

Wei Ding et al., "Rate Control of MPEG Video Coding and Recording by Rate-Quantization Modeling", IEEE, vol. 6 No., Feb. 1996, pp. 12-17.

Wen-Hsiung Chen, et al, "Scene Adaptive Coder", IEEE Transactions on Communications, vol. Com-32, No. 3, Mar. 1984 pp. 225-232.

International Search Report—PCT/US97/18624—International Search Authority, European Patent Office—Feb. 3, 1998.

Written Opinion—PCT/US97/18624—IPEA, US—Nov. 16, 1998.

International Preliminary Examination Report—PCT/US97/18624—IPEA, US—Feb. 4, 1999.

\* cited by examiner

ADAPTIVE RATE CONTROL FOR DIGITAL VIDEO COMPRESSION

CLAIM OF PRIORITY UNDER 35 U.S.C. §120

The present application for Patent is a continuation of patent application Ser. No. 09/907,153 entitled "ADAPTIVE RATE CONROL FOR DIGITAL VIDEO COMPRESSION" filed Jul. 16, 2001 now U.S. Pat. No. 7,023,915, which is a continuation of patent application Ser. No. 08/731,229 filed on Oct. 11, 1996 entitled "ADAPTIVE RATE CONTROL FOR DIGITAL VIDEO COMPRESSION" now issued as Pat. No. 6,366,614 on Apr. 2, 2002, and assigned to the assignee hereof and hereby expressly incorporated by reference herein.

BACKGROUND OF THE INVENTION

I. Field of the Invention

The present invention relates to image processing. More particularly, the present invention relates to a novel and improved system and method for adaptively controlling the digital bit rate of compression in a video encoder.

II. Description of the Related Art

In the field of transmission and reception of television signals, various improvements are being made to the NTSC (National Television Systems Committee) System. Developments in the field of television are commonly directed towards Standard Definition Television (SDTV) and High Definition Television (HDTV) Systems.

Many of the proposed SDTV and HDTV systems make use of digital encoding techniques. Digitally encoded video offers many advantages over analog modulation. Digital encoding provides a robustness of the communications link to impairments such as multipath and jamming. Furthermore, digital techniques facilitate ease in signal encryption, necessary for military and many broadcast applications.

When first proposed, HDTV seemed impractical due to excessive bandwidth requirements. However, it has been realized that compression of digital HDTV signals may be achieved to a level that enables transmission at bandwidths comparable to that required by analog NTSC formats. Such levels of signal compression coupled with digital transmission of the signal will enable a HDTV system to transmit with less power with greater immunity to channel impairments.

One compression technique capable of offering significant compression while preserving the quality of SDTV and HDTV signals utilizes adaptively sized blocks and sub-blocks of encoded discrete cosine transform (DCT) coefficient data. The technique is disclosed in U.S. Pat. No. 5,021,891, entitled "ADAPTIVE BLOCK SIZE IMAGE COMPRESSION METHOD AND SYSTEM", assigned to the assignee of the present invention and incorporated by reference. DCT techniques are also disclosed in U.S. Pat. No. 5,107,345, entitled "ADAPTIVE BLOCK SIZE IMAGE COMPRESSION METHOD AND SYSTEM", assigned to the assignee of the present invention and incorporated by reference. Further, U.S. Pat No. 5,452,104, entitled "ADAPTIVE BLOCK SIZE IMAGE COMPRESSION METHOD AND SYSTEM", is also assigned to the assignee of the present invention and incorporated by reference.

Techniques that offer substantial levels of compression often make use of variable-length encoding schemes. In variable-length encoding, different samples of a signal are quantized using different lengths of codewords. The coder is generally designed based on the theoretical or measured statistics of an image to minimize the overall reconstruction error. By exploiting the probability distribution of the characteristics in an image, high compression ratios are achievable.

Although variable-length encoding may provide for high compression ratios, it also causes the complication of a non-constant encoded data rate. Variable-length encoding generally produces long codewords for image areas with high details, and short codewords for image areas with low details. When variable-length encoding is used to encode video, different frames of the video may be encoded with different lengths of codewords. These codewords need to be transmitted through a communications channel at a predetermined bit rate. Further, in applications such as SDTV and HDTV systems, the codewords must be transmitted to the decoder at a rate which will permit for reconstruction of the frames of the video without fluctuations in the frame rate.

A rate buffer has been used to maintain the rate of transmission of the encoded data bits. However, the use of a buffer does not by itself solve the problem of fluctuations in the decoded frame rate. Further, buffer overflow may result when one frame of video has been encoded with long codewords which exceed the capacity of the buffer, resulting in loss of information. Consequently, rate control for video compression is necessary. These problems and deficiencies are clearly felt in the art and are solved by the present invention in the manner described below.

SUMMARY OF THE INVENTION

The present invention is a novel and improved system and method for controlling the encoded data rate in a video compression procedure. When video is compressed, different segments of the video may be encoded with different lengths of codewords. In order to transmit the codewords through a communications channel at a constant rate while maintaining the reliability of the encoder, control of the encoded bit rate is necessary. The present system and method accomplishes rate control by setting up alternative encoded bit streams for each segment of the video and selecting the alternative that would produce a bit rate closest to a predetermined target bit rate. The target bit rate is selected based on the rate buffer status.

In accordance with the present invention, an adaptive data rate controller which comprises a plurality of quantizers is disclosed. The rate controller receives as input a block of a video data, and the same block of video data is presented to each of the quantizers. Each quantizer quantizes the samples of the input according to a different weighting mask function to produce a block of quantized coefficients. Each weighting mask function is identified by a quantization index. A weighting mask function is designed to emphasize certain samples of the input and de-emphasize other samples by weighting the samples differently. Thus, the corresponding quantized samples of the different blocks of quantized coefficients may have different values as a result of having been weighted differently.

The adaptive rate controller also comprises a plurality of encoders. Each encoder receives one of the blocks of quantized coefficients, and produces a stream of variable-length encoded coefficients. Because each block of quantized coefficients has been processed by a different weighting function, the samples of each block may be encoded with different lengths of codewords. As a result, each stream of variable-length encoded coefficients may have a code length distinct from the others.

The variable-length encoded streams are presented to a selector, while the total bit rates required for transmitting each of the variable-length encoded streams are determined and presented to a comparator. The total bit rates are proportional to the sum of the code lengths of the encoded streams. The comparator compares each of the total bit rates with a predetermined target bit rate in order to determine the rate closest to the target. The selector then selects the variable-length encoded stream which would yield a bit rate closest to the predetermined target, and presents this stream to a rate buffer in preparation for transmission.

Now that the current block of video signal has been processed, the rate controller prepares to process the next block of video signal by updating the weighting mask functions. A quantization index update element selects a new set of quantization indices from which the weighting mask functions are derived. The new quantization indices are selected based on a model of rate versus quantization index and an updated target bit rate.

A model element derives the model of rate versus quantization index. The model is derived from the rate and quantization index data from the current block of video signal. Thus, the quantization indices used for the current block of video and the corresponding bit rates are used to derive the model. The updated target bit rate is derived by a target bit rate update element based on the rate buffer fullness level after processing the current block of video input. The updated target bit rate is selected so as to maintain a constant flow of data through the rate buffer as well as to prevent rate buffer overflow. Based on the model and the updated target bit rate, one new quantization index is the index which would yield the updated target bit rate as indicated by the model. Other new quantization indices will generally be functions of the already designated new quantization index.

After the weighting mask functions have been updated, the adaptive rate controller of the present invention begins processing the next block of video input.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
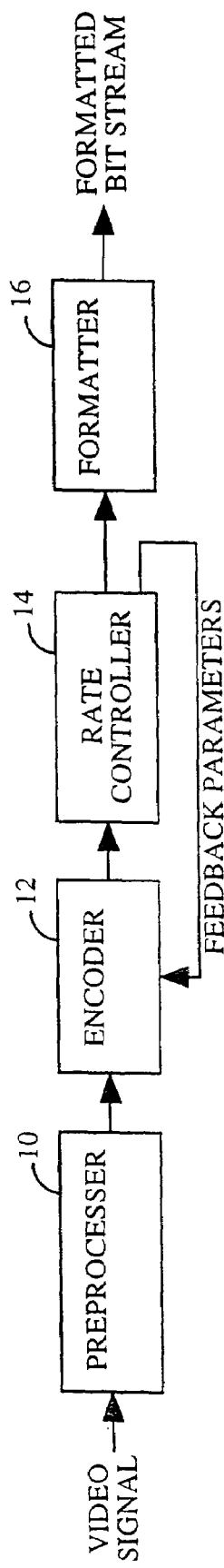
FIG. 1 is a block diagram illustrating an exemplary encoding system in which a rate controller is utilized.

An exemplary data compression system which incorporates the rate controller of the present invention is illustrated in FIG. 1. The system shown in FIG. 1 may be used to compress a video signal for transmission. For example, the system of FIG. 1 may be used to compress a HDTV or SDTV signal, although it should be understood that any other type of video, or even audio, signal may benefit from this compression system.

As shown in FIG. 1, a video signal is first presented to preprocessor 10 in preparation for compression. Preprocessor 10 may serve a variety of purposes, or may be excluded from the system altogether. Preprocessor 10 may, for example, format the video signal into components that are more easily processed by the compression system. The output of the preprocessor 10 is presented to encoder 12. Encoder 12 quantizes the data that it has received then compresses the quantized coefficients. The quantization scheme performed is dependent on feedback quantization parameters from rate controller 14. Rate controller 14 utilizes statistics characterizing the current encoded segment of video to adaptively set the quantization parameters for encoding the next segment of video. Rate controller 14 also presents the rate controlled encoded data to formatter 16. Formatter 16 takes the rate controlled data and assembles the data into a formatted bit stream for transmission through a communications channel.

Figure 2:
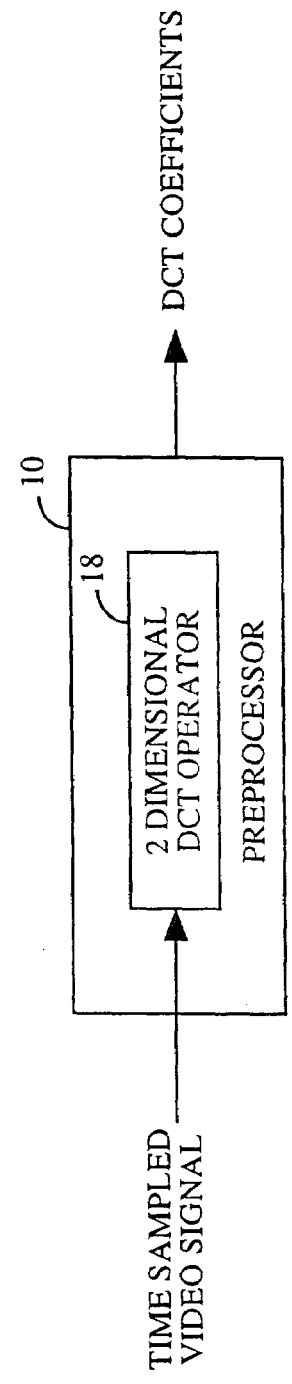
FIG. 2 is a block diagram illustrating an exemplary preprocessor which generates coefficients for the encoder.

One possible implementation of the preprocessor 10 is illustrated in FIG. 2. As shown in FIG. 2, preprocessor 10 comprises a Two Dimensional Discrete Cosine Transform (DCT) operator 18. One segment of a video signal, generally a N×N block of time-sampled pixels, is presented to DCT operator 18 as input. From the block of time-sampled pixels, DCT operator 18 generates a block of DCT coefficients.

DCT operator 18 is one method of converting a time-sampled signal to a frequency representation of the same signal. By converting to a frequency representation, the DCT techniques have been shown to allow for very high levels of compression, as quantizers can be designed to take advantage of the frequency distribution characteristics of an image. One compression system that utilizes DCT transforms is described in U.S. Pat. Nos. 5,021,891, 5,107,345, and 5,452,104 mentioned above.

The block of DCT coefficients is presented to encoder 12, with the encoded bit rate controlled by rate controller 14. In an exemplary embodiment, encoder 12 and rate controller 14 are implemented in a microprocessor or digital signal processor programmed to provide the functions as described.

Figure 3:
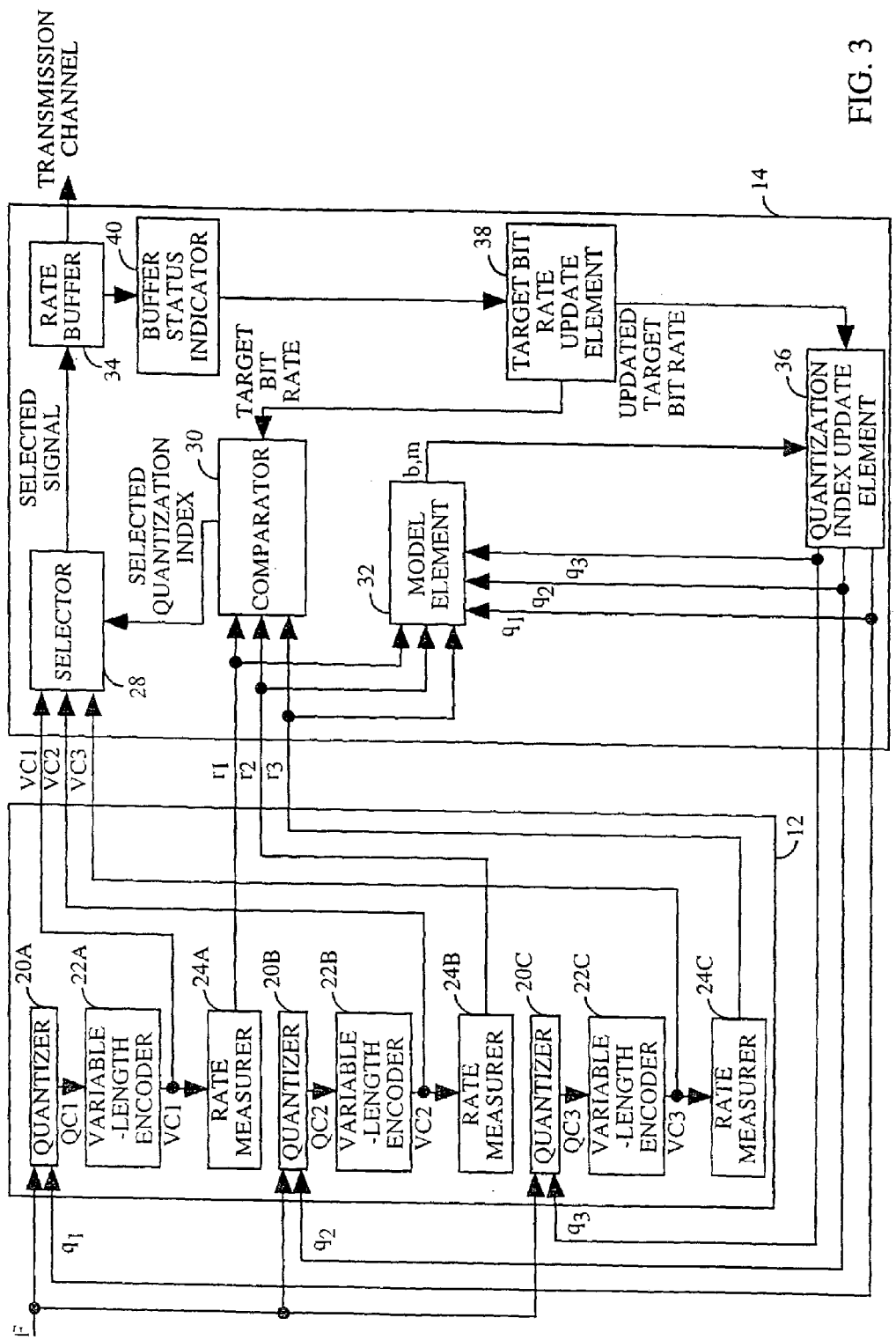
FIG. 3 is a block diagram illustrating the processing elements of the encoder and the rate controller.

Referring now to FIG. 3, the details of encoder 12 and rate controller 14 are shown. For purposes of illustration, FIG. 3 is described in terms of processing a luminance video signal. Processing of a color video signal will be described later. Encoder 12 comprises a plurality of quantizers 20a-20c and a corresponding plurality of variable length encoders 22a-22c. Three sets of quantizers 20a-20c and variable length encoders 22a-22c are shown, although it should be understood that a different number of elements may be used instead.

Each of the three quantizers 20a-20c receives the same block of DCT coefficients, designated F, as input. Each quantizer 20a-20c also receives from rate controller 14 a signal of a feedback quantization index, designated by q1-q3. In FIG. 3, the three quantizers 20a-20c represent three quantization settings, or three ways of quantizing the same input signal. The outputs of quantizers 20a-20c are blocks of quantized DCT coefficients, designated QC1-QC3 in FIG. 3.

In a preferred embodiment, the quantization setting used by each quantizer 20a-20c to quantize the input signal is a weighting mask function, also known in the art as a quantization matrix. Each weighting mask function is derived by multiplying a selected quantization step size (qssi) with the coefficients of a table of frequency weights. The qssi is a function of the quantization index qi, such that $$qss_i = f(q_i). \tag{1}$$

In a preferred embodiment, $$qss_i = 2^{(qi)}. \tag{2}$$

A table of frequency weights, of the same dimensions as the block of input DCT coefficients, is used to apply different weights to the different DCT coefficients. The weights are designed to emphasize the input samples having frequency content which the human visual system is more sensitive to, and to de-emphasize samples having frequency content that the visual system is less sensitive to. The weights are selected based on empirical data. A method for designing the weighting masks for 8×8 DCT coefficients is disclosed in ISO/IEC JTC1 CD 10918, "Digital compression and encoding of continuous-tone still images—part 1: Requirements and guidelines," International Standards Organization, 1994, which is herein incorporated by reference.

Thus, quantization index q1 is multiplied with the table of frequency weighting masks to produce a first weighting mask function. The DCT coefficients are multiplied with corresponding coefficients of the first weighting mask function to produce a first block of quantized coefficients, designated QC1. Likewise, quantization indices q2 and q3 are each multiplied with the same table of frequency weighting masks to produce second and third weighting mask functions in quantizers 20b and 20c, respectively. Then, the DCT coefficients are multiplied with the corresponding coefficients of the second weighting mask function to produce a second block of quantized coefficients, designated QC2. The DCT coefficients are also multiplied with the corresponding coefficients of the third weighting mask function to produce a third block of quantized coefficients, designated QC3. Letting (k,l) refer to the position of a coefficient within a block, and FWM refer to the table of frequency weighting masks, the operations of quantizers 20a-20c may be described by the following equations:

$$QC1(k,l) = F(k,l) \times FWM(k,l) \times qss_1; \tag{3}$$

$$QC2(k,l) = F(k,l) \times FWM(k,l) \times qss_2; \tag{4}$$

$$QC3(k,l) = F(k,l) \times FWM(k,l) \times qss_3. \tag{5}$$

The signals QC1-QC3 are input to variable length encoders 22a-22c respectively. The quantized DCT coefficient values are each encoded using variable length encoders in order to minimize the data rate. The three variable length encoders 22a-22c shown in FIG. 3 may all implement the same variable length encoding scheme or may implement different variable length encoding algorithms. The outputs of the variable length encoders 22a-22c are signals of serialized streams of variable length encoded coefficients and are designated VC1-VC3.

One technique for implementing variable length encoders 22a-22c makes use of run-length encoding of zeros after zigzag scanning followed by Huffman encoding. This technique is discussed in detail in aforementioned U.S. Pat. Nos. 5,021,891, 5,107,345, and 5,452,104, and is summarized herein. A run-length coder would take the quantized signals, in this case QC1-QC3, and separate out the zero from the non-zero coefficients. The zero values are referred to as run-length values, and are Huffman encoded. The non-zero values are separately Huffman encoded.

Huffman codes are designed from either the measured or theoretical statistics of an image. It has been observed that most natural images are made up of blank or relatively slowly varying areas, and busy areas such as object boundaries and high-contrast texture. Huffman coders with frequency-domain transforms such as the DCT exploit these features by assigning more bits to the busy areas and fewer bits to the blank areas.

Referring still to FIG. 3, it can be seen that the signals VC1-VC3 are input to corresponding rate measurers 24a-24c. Each of rate measurer 24a-24c determines the bit rate required to transmit the respective variable length encoded coefficients of signals VC1-VC3. The output from each rate measurer 24a-24c is a signal of a single value indicative of the bit rate of the block of DCT coefficients. The bit rate is proportional to the number of bits required to variable length encode the block of DCT coefficients. The signals corresponding to outputs from rate measurers 24a-24c are designated r1-r3, respectively.

Two sets of signals are output from encoder 12 to rate controller 14. Rate controller 14 receives the signals of the variable length encoded coefficients, VC1-VC3. One of VC1-VC3 is to be selected by rate controller 14 for transmission. Rate controller 14 also receives signals r1-r3 representative of the bit rates of the variable length encoded coefficients VC1-VC3. The rate information helps in the selection of the variable length encoded coefficients. Also, utilizing the rate information, rate controller 14 generates updated quantization indices to be used by quantizers 20a-20c in quantizing the next segment of video input. The updated indices are established so as to control the bit rate of the next segment of video input.

As shown in FIG. 3, signals indicative of variable length encoded coefficients VC1-VC3 are input to selector 28 of rate controller 14, while signals indicative of rates r1-r3 are input to comparator 30 and model element 32 of rate controller 14. Comparator 30 compares the three rates r1-r3 with a desired bit rate in order to choose the rate closest to the desired rate. Based on the chosen rate, comparator 30 provides a signal to selector 28 indicating which one of the streams of variable length encoded coefficients, VC1, VC2, or VC3, has been selected for transmission. The function of model element 32 will be described later.

Several selection algorithms may be used to select the stream of variable length encoded coefficients for transmission. A preferred embodiment selects the stream that minimizes the absolute encoded rate error. This method compares a predetermined target bit rate with each of the rates r1, r2, and r3 according to the equation:

$$\min |T - r_i| \tag{6}$$

where T is the target bit rate and ri for i=1, 2, 3 refers to rates r1-r3, respectively. In an alternative embodiment, selector 28 selects the variable length encoded stream that minimizes the rate error and that has a rate less than the target rate. In a second alternative embodiment, selector 28 selects the stream that produces the minimum rate.

Selector 28 provides the signal of the stream of variable length encoded coefficients that has been selected for transmission to rate buffer 34 to await transmission through the communications channel. The selected signal represents a rate controlled video signal. Then, referring back to FIG. 1, the rate controlled data signal is presented to formatter 16, which formats the data signal with control and identification signals in preparation for transmission. Signals indicative of start of block, start of frame, block number, frame number, and quantization information are some of the signals that are appended to the data signal by formatter 16.

At this point, the current segment of the video input has been processed for transmission. It is now necessary to update the system in order to rate controllably encode the next segment of video and prepare the next segment for transmission.

As rate controller 14 adjusts the encoded bit rate by selecting among three streams of encoded coefficients for each segment of video, a new set of three quantization indices needs to be derived.

The new quantization indices are derived by quantization index update element 36, shown in FIG. 3. Quantization index update element 36 derives the indices based on input signals from model element 32 and target bit rate update element 38. Model element 32 derives a model of encoded bit rate versus quantization index. Target bit rate update element 38 derives an updated target bit rate for the next segment of video input. Based on the updated target bit rate and the model of encoded bit rate versus quantization index, three updated quantization indices will be selected for quantizing the next segment of video.

Model element 32 derives a model of quantization index versus bit rate for the next segment of video based on the data of quantization indices and rates from the current segment of video. Referring still to FIG. 3, it can be seen that model element 32 receives as input signals indicative of the three quantization indices q1-q3 that are used to process the current segment of video. Model element 32 also receives as input signals of the three rates r1-r3 corresponding to the rates of the current three streams of variable length encoded coefficients VC1-VC3. From three sets of data points (q1, r1), (q2, r2), and (q3, r3), a model is derived by fitting a curve through the three data points. In a preferred embodiment, an exponential model is used for the curve fitting.

The exponential model is defined according to the equation:

$$\text{rate}_i = y_i = bm^{x_i}, \quad (7)$$

where $x_i$ denotes the quantization index, set to range from 0 to 31 in a preferred embodiment, although it should be understood that a different range of quantization indices may be used instead. The corresponding encoded rate is denoted by $\text{rate}_i$ ($y_i$). The parameters $b$, $m$ of the exponential model can be determined by recognizing that:

$$\ln \text{rate}_i = \ln y_i = \ln b + x_i \ln m. \quad (8)$$

Then, letting $\Lambda$ denote the set of n (n=3) quantization indices utilized to encode the current frame of data, the least squares solution to the model can be defined as:

$$\ln m = \frac{n \sum_{i \in \Lambda} x_i \ln y_i - \left(\sum_{i \in \Lambda} x_i\right)\left(\sum_{i \in \Lambda} \ln y_i\right)}{n \sum_{i \in \Lambda} x_i^2 - \left(\sum_{i \in \Lambda} x_i\right)^2}, \quad (9)$$

and $$\ln b = \frac{\left(\sum_{i \in \Lambda} \ln y_i\right)\left(\sum_{i \in \Lambda} x_i^2\right) - \left(\sum_{i \in \Lambda} x_i\right)\left(\sum_{i \in \Lambda} x_i \ln y_i\right)}{n \sum_{i \in \Lambda} x_i^2 - \left(\sum_{i \in \Lambda} x_i\right)^2}. \quad (10)$$

Figure 4:
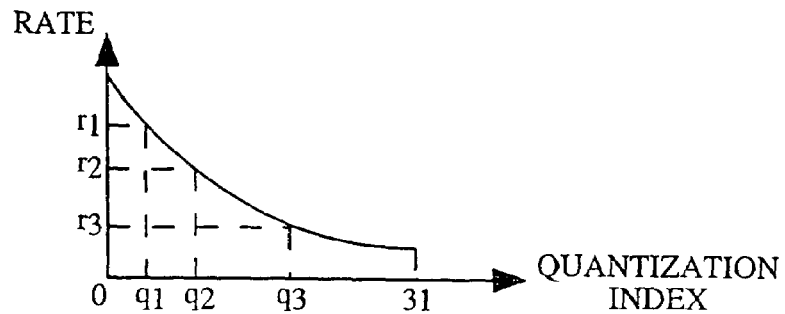
FIG. 4 is a graph illustrating an exponential model of quantization index versus bit rate.

An illustration of an exemplary exponential model is shown in FIG. 4. The exponential model shown in FIG. 4 is derived from the three pairs of data points (q1, r1), (q2, r2), and (q3, r3). Signals of the parameters b and m are input to quantization index update element 36.

As previously mentioned, quantization index update element 36 also receives as input signals of an updated target bit rate from target bit rate update element 38. Referring back to FIG. 3, the updated target bit rate is determined by target bit rate update element 38 based on the rate buffer status, or the rate buffer fullness level, after processing the current segment of video input. Rate buffer status indicator 40, coupled to rate buffer 34, determines the rate buffer status, or fullness level, and sends a signal indicative of the status to target bit rate update element 38.

Let BF denote the rate buffer status. Rate buffer status indicator 40 determines the rate buffer status after processing the current segment of video input ($BF_k$) as follows:

$$BF_k = BF_{k-1} + R_k - M, \quad (11)$$

where $BF_{k-1}$ is the rate buffer status before processing the current segment, $R_k$ is the data bit rate for the current segment, and M is the fixed transmission bit rate.

Target bit rate update element 38 then determines the updated target rate, $NT_k$, according to the following:

$$NT_k = M - \alpha(BF_k - \gamma BF_{max}). \quad (12)$$

where M is again the fixed transmission rate, BFmax is the size of the rate buffer, □ is a constant that determines how fast the rate buffer converges to the desired rate buffer fullness level, and □ (0.0 □ □ □ 1.0) is the desired rate buffer fullness level.

In a preferred embodiment, to slow the response of the rate control system in order to prevent fluctuations in the bit rate, a smoothed updated target rate, $SNT_k$, may be derived as follows:

$$SNT_k = \beta NT_k + (1-\beta) SNT_{k-1}. \quad (13)$$

$SNT_k$ can be used instead of $NT_k$ in the selection process. In a preferred embodiment, $\alpha$ is set to 0.2, and $\beta$ is set to 0.4.

A signal indicative of the updated target bit rate $NT_k$ is presented to comparator 30 to be used for processing the next segment of video input. A signal indicative of the updated target rate $NT_k$ is also presented to quantization index update element 38 to be used for selecting a set of three updated quantization indices ($q_{1'}$-$q_{3'}$) to be used by quantizers 20a-20c for processing the next segment of video input.

Once quantization index update element 36 has received signals indicative of the updated target bit rate $NT_k$ and the parameters b and m of the rate versus quantization index model, an updated set of quantization indices (q1'-q3') may be selected for quantizing the next segment of video input.

Quantization index update element 36 may use a number of methods to select the updated set of quantization indices q1'-q3'. A preferred embodiment selects the quantization index q2' first. It is determined according to the equation:

$$q_2' = \text{round}\left(\frac{\ln NT_k - \ln b}{\ln m}\right), \quad (14)$$

where the value $NT_k$ is the updated target bit rate and the values of b and m are the parameters of the exponential model described above.

The other two quantization indices, q1' and q3', may be updated according to either the one-anchor or two-anchor update method. These methods define a spread to be the minimum difference in quantization indices between any of the three quantization indices q1', q2', and q3'. The spread is generally set at 5 for a luminance HDTV signal input. The spread depends on the spacing between the indices.

The one-anchor method defines an anchor index as A1. Also, it defines qmax be the maximum quantization index which equals 31. Assuming that 0 □ spread □ A1 and 0 □ spread □ |qmax−A1|, the one-anchor method sets q3' equal to A1 unless A1 is within spread of q2'. In that case, q3' is set to an index spread away from q2'. The one-anchor update algorithm is defined as follows:

If $|q_{2'}-A1|<$spread, then $q_{1'}=q_{2'}-$spread and $q_{3'}=q_{1'}+$spread.

If $q_{2'} \geq A1+$spread and $q_{2'} \square\ q_{max}-$spread, then $q_{1'}=q_{2'}+$spread and $q_{3'}=A1$.

If $q_{2'} \square\ A1-$spread and $q_{2'} \geq$spread, then $q_{1'}=q_{2'}-$spread and $q_{3'}=A1$.

If $q_{2'} \geq A1+$spread and $q_{2'}>q_{max}-$spread, then $q_{1'}=q_{2'}-$spread and $q_{3'}=A1$.

If $q_{2'} \square A1-$spread and $q_{2'}<$spread, then $q_{1'}=q_{2'}+$spread and $q_{3'}=A1$.

If $q_{2'}=A1$ and $q_{max}-A1<$spread, then $q_{1'}=q_{2'}-2*$spread and $q_{3'}=q_{2'}-$spread.

If $q_{2'} \square\ q_{max}-$spread and $q_{max}-A1<$spread, then $q_{1'}=q_{2'}-$spread and $q_{3'}=q_{2'}+$spread.

If $q_{2'}=A1$ and $A1<$spread, then $q_{1'}=q_{3'}+$spread and $q_{3'}=q_{2'}+2*$spread.

The two-anchor method defines two fixed anchors A1 and A2 where A1<A2. The two-anchor method ensures that bit rate overshoots and undershoots are reduced to acceptable levels. Recall that the spread is the minimum difference in quantization indices between any of the three quantization indices q1', q2', and q3'. Assume that $2*$ spread $\square$ A2−A1, spread $\square$ A1, and spread $\square$ |qmax−A2|. The two-anchor method sets q1' to A1, and sets q3' to A2 unless A1 or A2 are within spread of q2'. In these cases either q1' or q3' is set to an index spread away from q2'. The two-anchor update algorithm is defined as follows:

If $|q_{2'}-A1|<$spread and $q_{2'} \geq$spread, then $q_{1'}=q_{2'}-$spread and $q_{3'}=A2$.

If $|q_{2'}-A1|<$spread and $q_{2'}<$spread, then $q_{1'}=q_{2'}+$spread and $q_{3'}=A2$.

If $|q_{2'}-A2|<$spread and $q_{2'} \square\ q_{max}-$spread, then $q_{1'}=A1$ and $q_{3'}=q_{2'}+$spread.

If $|q_{2'}-A2|<$spread and $q_{2'}>q_{max}-$spread, then $q_{1'}=A1$ and $q_{3'}=q_{2'}-$spread.

If $|q_{2'}-A1| \geq$spread and $|q_{2'}-A2| \geq$spread, then $q_{1'}=A1$ and $q_{3'}=A2$.

In a preferred embodiment, if the middle quantization index q2' produces too many bits, then all quantization indices are increased for the next frame, thereby decreasing the bit rate for the next block of data. If the middle quantization index q2' produces too few bits, then all quantization indices are decreased for the next frame, thereby increasing the bit rate for the next block of data.

It should be understood that instead of selecting three quantization indices to process each block of data input, a different number of indices may be used instead. As previously mentioned, the number of quantizers may be a number other than three. In this case, a corresponding number of variable length encoders will be needed to encode the quantized coefficients to be provided to the selector, which then selects the rate controlled signal from among all encoded coefficients. Also, a corresponding number of rate measurers will determine the data bit rates of the encoded coefficients. The rates are provided to the comparator which compares all rates with the predetermined target rate to help in the process of selecting the rate controlled signal. The rates are also provided to the model element which derives the quantization index versus bit rate model. The required number of quantization indices are selected from the model. Thus, the desired encoded bit stream may be selected from any of a predetermined plurality of encoded bit streams.

Although the present invention has thus far been described primarily with respect to luminance video signals, it can be appreciated that the present invention is equally applicable to color signals. One technique for processing color signals is to first convert the signal from RGB space to YC1C2 space, with Y being the luminance, or brightness, component, and C1 and C2 being the chrominance, or color, components. Because of the low spatial sensitivity of the eye to color, most researchers sub-sample the C1 and C2 components by a factor of four in the horizontal and vertical directions. Two possible YC1C2 representations are the YIQ representation and the YUV representation, both of which are well known in the art. Referring to FIG. 1, both the RGB to YC1C2 conversion (not shown) and sub-sampling (not shown) may be performed by preprocessor 10.

In a preferred embodiment for processing color video, four luminance components (hereafter designated Y1-Y4) and two chrominance components (hereafter designated C1 and C2) are used to represent each segment of video input. There are four luminance components for each chrominance component because each chrominance component is sub-sampled by four. For each of the six components, three quantization indices are selected, in order to produce three blocks of quantized coefficients for each component. Further, three streams of variable length encoded coefficients are generated from each set of three blocks of quantized coefficients. Rate controller 14 must select one of each set of three streams for transmission.

Figure 5A:
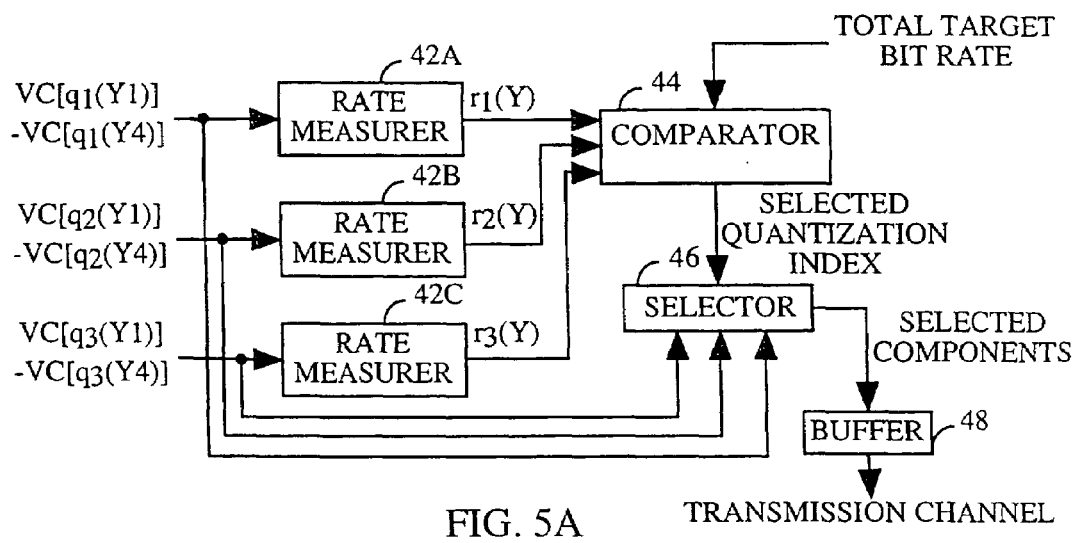
FIGS. 5a-5c are block diagrams illustrating the processing elements which select the rate controlled data components of a color signal for transmission.
Figure 5B:
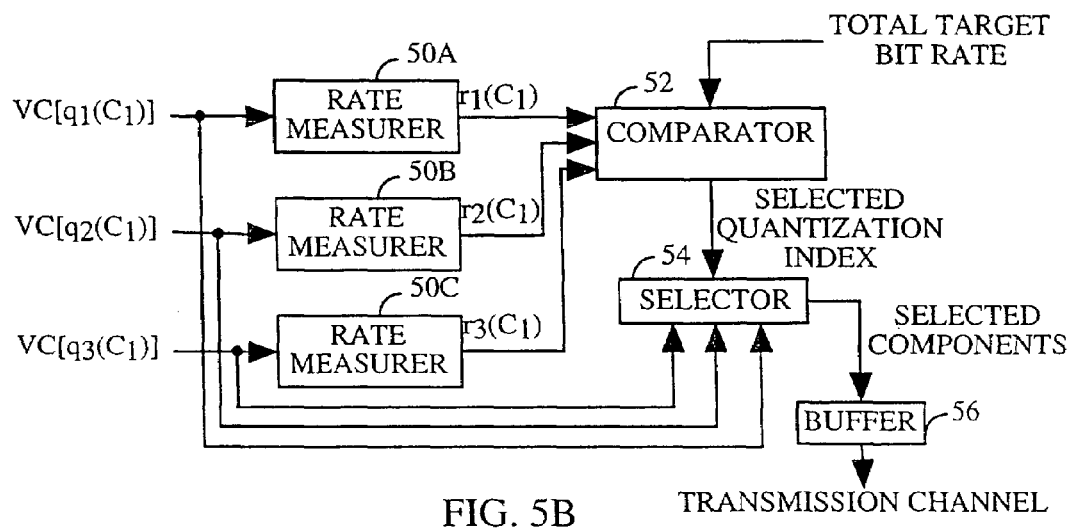
Figure 5C:
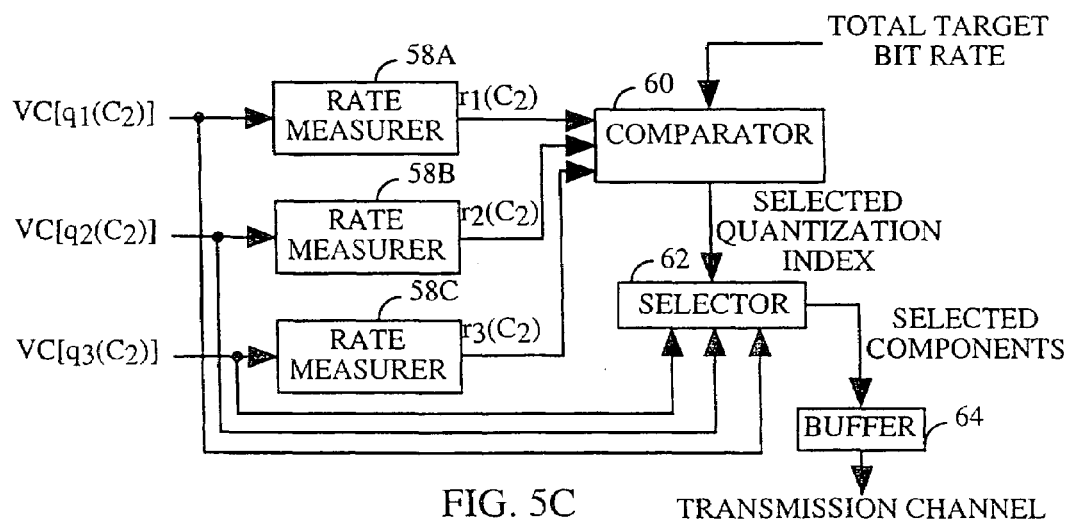

FIGS. 5a-5c illustrate the elements of rate controller 14 that perform the selection of the streams of variable length encoded coefficients for inputs Y1-Y4, C1, and C2. As in the above description for processing a luminance only signal, FIGS. 5a-5c show that three alternative encoded signals are used to select each rate controlled signal. However, it should be understood that the present invention is equally applicable in systems which generate a different number of alternative encoded signals from which the rate controlled signal is selected.

In the illustrated embodiment of FIGS. 5a-5c, each of the four luminance inputs Y1-Y4 has been quantized based on the same quantization indices (q1-q3) to produce q1(Y1)-q1(Y4), q2(Y1)-q2(Y4), and q3(Y1)-q3(Y4). It should be understood, however, that the different luminance components Y1-Y4 may be quantized based on different quantization indices. The quantization is performed by quantizers such as quantizers 20a-20c shown in FIG. 3. Further, each quantized component is encoded using variable-length encoding, producing signals designated in FIG. 5a as VC[q1(Y1)]-VC[q1(Y4)], VC[q2(Y1)]-VC[q2(Y4)], and VC[q3(Y1)]-VC[q3(Y4)]. The variable-length encoding is performed by variable length encoders such as variable length encoders 22a-22c in FIG. 3.

The chrominance inputs C1 and C2 are also quantized and variable-length encoded. The quantization indices for the C1 and C2 components are not necessarily the same, but may be the same, as those used for Y1-Y4. In FIGS. 5b and 5c, the encoded C1 and C2 components are designated as VC[q1(C1)], VC[q2(C1)], and VC[q3(C1)], and VC[q1(C2)], VC[q2(C2)], and VC[q3(C2)]. The variable-length encoding is performed by variable length encoders such as variable length encoders 22a-22c in FIG. 3. Just as for the luminance components, the quantization of the chrominance components is performed by quantizers such as quantizers 20a-20c of FIG. 3, and the variable length encoding is performed by elements such as variable length encoders 22a-22c in FIG. 3.

In processing the luminance components, the variable length encoded components that have been quantized based on the same quantization index are input to the same rate measurer. As shown in FIG. 5a, signals VC[q1(Y1)]-VC[q1

(Y4)] are input to rate measurer 42a, signals VC[q2(Y1)]-VC [q2(Y4)] are input to rate measurer 42b, and signals VC[q3(Y1)]-VC[q3(Y4)] are input to rate measurer 42c. Accordingly, a total rate is determined for all luminance components corresponding to a particular quantization index. Signals of rates determined by rate measurers 42a, 42b, and 42c are designated r1(Y), r2(Y), and r3(Y), respectively, and r1(Y)-r3(Y) are input to comparator 44. Comparator 44 also receives as input a signal of a predetermined target bit rate. In a preferred embodiment, comparator 44 then uses the minimum absolute rate error selection criterion as described in Equation (6) above to compare rates r1(Y), r2(Y), and r3(Y) with the target bit rate in order to choose the rate closest to the target bit rate, and a signal of the quantization index corresponding to the chosen rate is presented to selector 46. Selector 46 also receives as input the variable length encoded coefficients VC[q1(Y1-Y4)], VC[q2(Y1-Y4)], and VC[q3(Y1-Y4)]. Selector 46 then selects the four components of the luminance input that have been quantized by the selected quantization index, and presents these four components to rate buffer 48 for transmission.

Referring to FIG. 5b, it can be seen that the C1 chrominance component is processed in a manner similar to the luminance components, except each of rate measurers 50a-50c need only to determine the data rate of a single C1 component, not four luminance components. Rate measurer 50a receives as input the variable length encoded coefficients VC[q1(C1)] corresponding to quantization index q1, and generates data rate r1(C1) as output. Similarly, rate measurers 50b and 50c receive as inputs variable-length coefficients VC[q2(C1)] and VC[q3(C1)] corresponding to quantization indices q2 and q3, respectively, and generate data rates r2(C1) and r3(C1) as output. Signals indicative of rates r1(C1)-r3(C1) are input to comparator 52. Comparator 52 may again use the minimum absolute rate error selection criterion of Equation (6) above to choose the rate closest to the target bit rate, and present to selector 54 a signal of the quantization index corresponding to the chosen rate. Selector 54 then selects from the three C1 components, VC[q1(C1)]-VC[q3(C1)], the one C1 component quantized by the selected quantization index to present to rate buffer 56 for transmission.

Referring now to FIG. 5c, it can be seen that the C2 component is also processed in a manner similar to the C1 component. Again, each rate measurer 58a-58c determines the data rate associated with each of three variable-length encoded streams VC[q1(C2)], VC[q2(C2)], and VC[q3(C2)]. The rates, designated r1(C2)-r3(C2), are input to comparator 60. In a preferred embodiment, comparator 60 chooses from rates r1(C2)-r3(C2) the rate closest to the target bit rate based on the absolute rate error selection criterion of Equation (6) above, and presents to selector 62 a signal of the quantization index corresponding to the chosen rate. Selector 62 selects the variable length encoded coefficients produced according to the selected quantization index, and presents the signal of the selected coefficients to rate buffer 64 for transmission.

It should be understood that although FIGS. 5a-5c show comparators 44, 52, and 60 as three separate blocks, the three blocks may be combined so that a single comparator receives as input all of the signals r1(Y)-r3(Y), r1(C1)-r3(C1), and r1(C2)-r3(C2). The single comparator also receives as input a total target bit rate. Likewise, selectors 46, 54, and 62 may be combined as a single selector which receives as input the selected index or indices from the single comparator, and receives as input all variable-length coefficients VC[q1(Y1)]-VC[q1(Y4)], VC[q1(C1)]-VC[q3(C1)], and VC[q1(C2)]-VC[q3(C2)]. In addition, the single selector may send all selected components to one combined rate buffer rather than the three rate buffers 48, 56, and 64.

The single comparator and single selector may use a number of decision rules to select the streams of variable-length coefficients for transmission. In a preferred embodiment, the 27 possible combinations of the sum ri(Y)+rj(C1)+rk(C2), ($1 \le i \le 3, 1 \le j \le 3, 1 \le k \le 3$) are each compared with the total target bit rate. The sum which is closest to the total target bit rate, or which minimizes the absolute encoded rate error, is determined. Then, a signal indicative of the three quantization indices corresponding to the sum is provided to the single selector, which selects the components that have been quantized by the three quantization indices, and presents these components to the rate buffer in preparation for transmission. As an example, rates r2(Y), r1(C1), and r1(C2) may sum up to a value which is closest to the total target bit rate. The single comparator thus presents the quantization indices q2 for the Y components, q1 for the C1 component, and q1 for the C2 component to the single selector. The single selector then selects the signals VC[q2(Y1-Y4)], VC[q1(C1)], and VC[q1(C2)] and presents these signals to the rate buffer for transmission.

Figure 6:
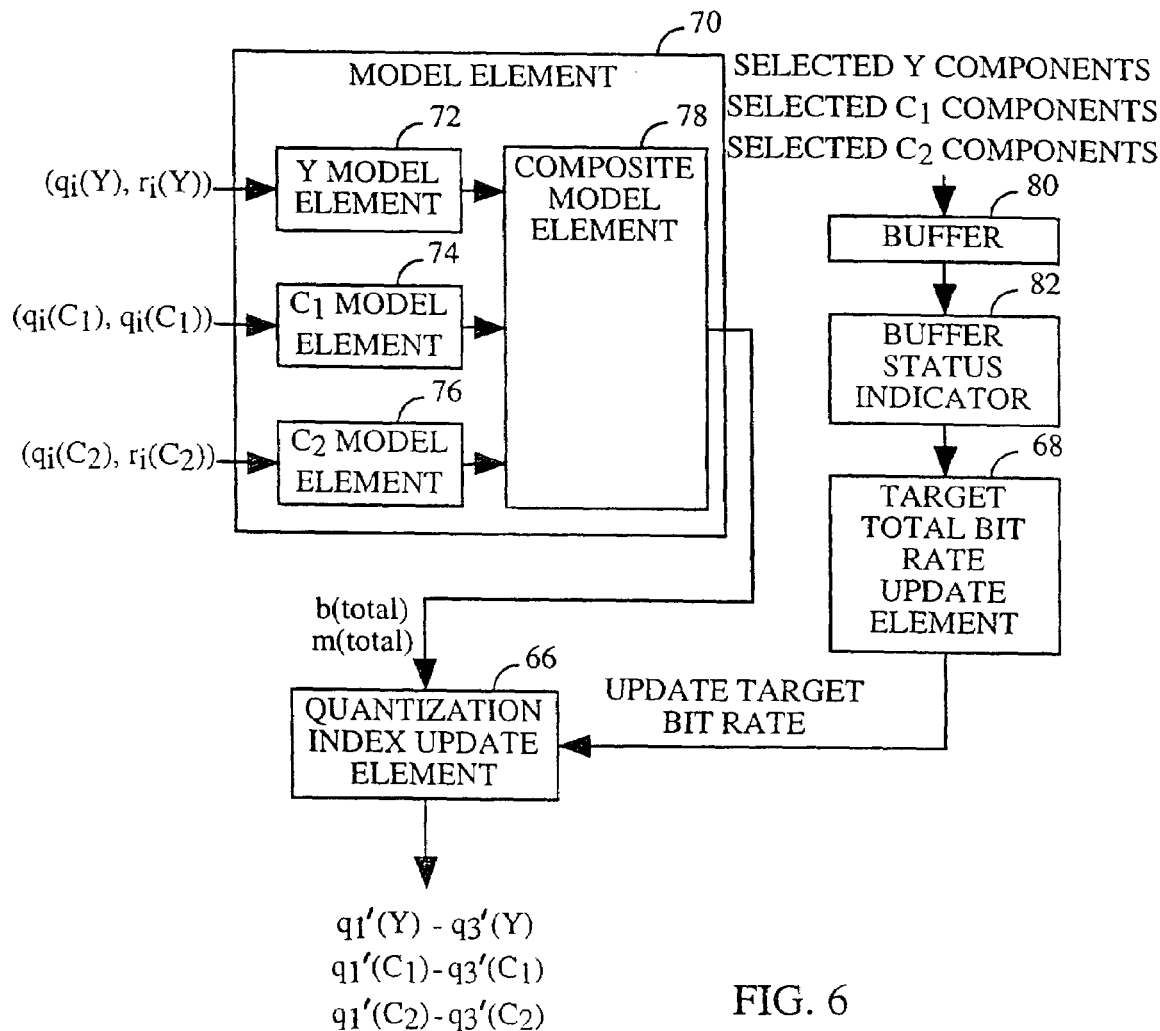
FIG. 6 is a block diagram illustrating the processing elements which derive the quantization indices to be used for quantizing a received color video signal.

Just as for luminance video, a rate controller for processing color video needs to update the quantization indices for processing the next segment of video. Again, the updated indices are based on a model of quantization index versus rate derived from the quantization index and rate data of the current segment of video. Referring now to FIG. 6, quantization index update element 66 produces quantization indices q1'-q3' for the next segment of video based on two inputs. One input is a signal of the updated target bit rate. In a preferred embodiment, the target bit rate is a total target bit rate for all luminance and chrominance components, produced by target total bit rate update element 68 Another input is a signal of the parameters (b and m) of the model of rate versus quantization index derived by model element 70. In the preferred embodiment, model element 70 derives a composite model for all luminance and chrominance components.

The operation of the preferred embodiment of model element 70 may be better understood with reference to FIGS. 7a-7d in conjunction with FIG. 6. As shown in FIG. 6, model element 70 comprises three component model elements designated Y model element 72, C1 model element 74, and C2 model element 76. The three component elements derive component models from which a composite model is derived by composite model element 78.

Each component model element derives an exponential model of quantization index versus rate for the component based on the quantization indices used and their corresponding rates from the current segment of input. Y model element 72 receives as input three sets of data points (q1(Y), r1(Y)), (q2(Y), r2(Y)), and (q3(Y), r3(Y)), designated by (qi(Y), ri(Y)) in FIG. 6. The data rates ri(Y) refer to the total rates from encoding all four luminance components of one segment of video input for the three quantization indices. The three sets of data points are used to derive the Y-component exponential model illustrated in FIG. 7a, according to Equations (7)-(10) above.

Figure 7A:
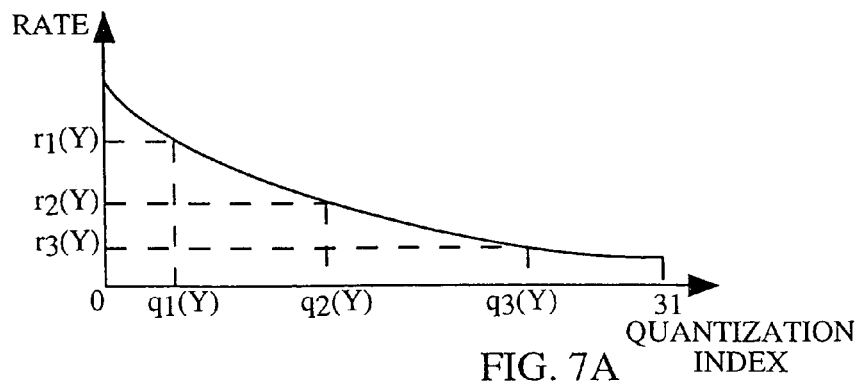
FIGS. 7a-7c are a series of graphs illustrating models of quantization index versus bit rate for each of the color components of a color signal.
Figure 7B:
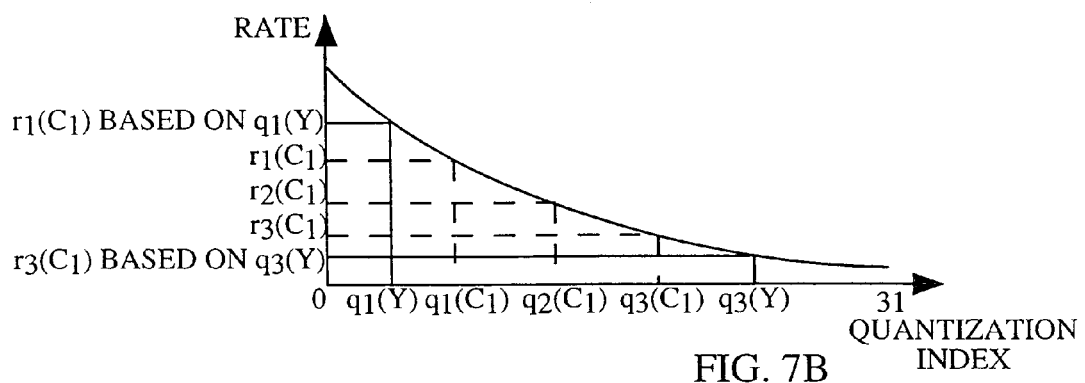
Figure 7C:
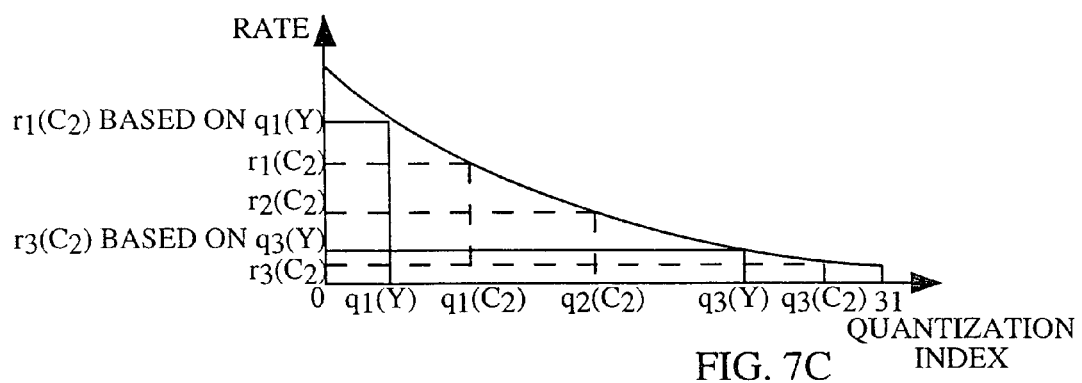

C1 model element 74 receives as input three sets of data points (q1(C1), r1(C1)), (q2(C1), r2(C1)), and (q3(C1), r3(C1)), designated by (qi(C1), ri(C1)) in FIG. 6. The data points are the quantization indices used for the C1 component and the data rates resulting from the use of the quantization indices. The three sets of data points are used to derive the C1-component exponential model illustrated in FIG. 7b, again according to Equations (7)-(10) above. Then, based on the model, rates at the current quantization indices for the Y component are estimated. In FIG. 7b, q2(C1) has been set to equal to q2(Y), so r2(C1) based on q2(Y) remains r2(C1). However, estimates are derived for r1(C1) based on q1(Y) and r3(C1) based on q3(Y).

Similarly, C2 model element 76 receives as input three sets of data points (q1(C2), r1(C2)), (q2(C2), r2(C2)), and (q3(C2), r3(C2)), designated by (qi(C2), ri(C2)) in FIG. 6. The data points are the quantization indices used for the C2 component and the data rates resulting from the use of the quantization indices. These three sets of data points are used to derive the C2-component exponential model illustrated in FIG. 7c, according to Equations (7)-(10) above. Also, rates at the current quantization indices for the Y component are estimated based on the C2-component model. Thus, r1(C2) based on q1(Y), r2(C2) based on q2(Y), and r3(C2) based on q3(Y) are estimated. In FIG. 7b, q2(C2)=q2(Y), thus r2(C2) based on q2(Y) remains r2(C2).

From the three component models, a composite model is derived. The composite model is based on three sets of data points: (q1(Y), r1(total)), (q2(Y), r2(total)), and (q3(Y), r3(total)). The total rates are determined according to the following equations:

$$r_1(\text{total})=r_1(Y)+r_1(C_1) \text{ based on } q_1(Y)+r_1(C_2) \text{ based on } q_1(Y); \quad (15)$$

$$r_2(\text{total})=r_2(Y)+r_2(C_1) \text{ based on } q_2(Y)+r_2(C_2) \text{ based on } q_2(Y); \quad (16)$$

$$r_3(\text{total})=r_3(Y)+r_3(C_1) \text{ based on } q_3(Y)+r_3(C_2) \text{ based on } q_3(Y). \quad (17)$$

Figure 7D:
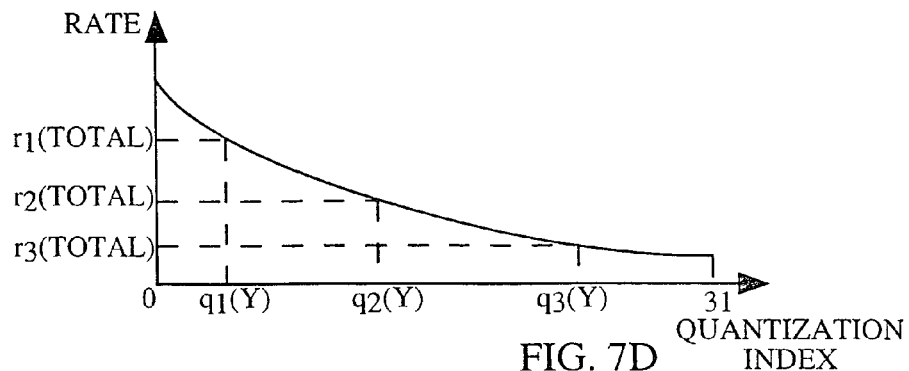
FIG. 7d is a graph illustrating a composite model of quantization index versus bit rate for all components of a color signal.

The composite model is illustrated in FIG. 7d. Again, an exponential model according to Equations (7) is used to derive the model. Further, the least squares solution to the model as defined in Equations (9)-(10) is used to derive the model parameters b(total) and m(total). As mentioned above, signals of b(total) and m(total) are input to quantization index update element 66.

The other input to quantization index update element 66, the updated target total bit rate, is derived by target total bit rate update element 68 based on the rate buffer status after processing the current segment of input signal. Referring back to FIGS. 5a-5c, it can be seen that the selected Y, C1, and C2 components are presented to rate buffers 48, 56, and 64 prior to transmission through the communications channel. As described above, although rate buffers 48, 56, and 64 are shown as three separate rate buffers, it should be understood that there may be just one rate buffer shared among all components. In the embodiment illustrated in FIG. 6, a single rate buffer 80 receives all selected Y, C1, and C2 components. Rate buffer status indicator 82 then determines the rate buffer status (BFk) after processing the current segment of video input based on Equation (11) above. The rate buffer status BFk is provided to target total bit rate update element 68, which derives the updated target bit rate NTk based on Equation (12) above. Target total bit rate update element 68 then provides the updated target bit rate NTk to quantization index update element 66.

Having obtained inputs of b(total), m(total), and updated target total bit rate, quantization index update element 66 is now ready to select updated quantization indices for processing the next segment of video input. Three quantization indices are to be selected for each Y, C1, and C2 component. For the Y component, the updated quantization indices will be referred to as q1'(Y)-q3'(Y), for the C1 component, the updated quantization indices will be referred to as q1'(C1)-q3'(C1), and for the C2 component, the updated quantization indices will be referred to as q1'(C2)-q3'(C2).

In a preferred embodiment, the update algorithm selects the same middle quantization index for all Y, C1, and C2 components. The quantization index q2'(Y) is selected according to Equation (14) above. The middle quantization indices for the C1 and C2 components, q2'(C1) and q2'(C2) are set to equal q2'(Y). Then, the two-anchor method described above is used to set q1'(Y) and q3'(Y) for all luminance components. The other C1 and C2 quantization indices are selected so that they are different and have an absolute difference of spread from the q2'(C1) and q2'(C2) quantization indices, respectively. These updated quantization indices are then presented to encoder 12 (FIG. 1) to be used for quantizing the next segment of input signal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A processor for adaptively controlling an encoded bit rate of a video input for image compression, said processor being configured to:
   encode a segment of video signal in accordance with a predetermined set of quantization settings to generate a plurality of encoded streams of data bits;
   select one of the encoded streams in accordance with a predetermined selection algorithm based on a bit rate;
   generate a control signal based on the selected one of the encoded streams; and
   update the quantization settings in accordance with the control signal.

2. The processor of claim 1, wherein the processor encodes by:
   quantizing the segment of video signal to generate a plurality of quantized streams, each of the plurality of quantized streams being quantized according to one of the quantization settings; and
   variable-length encoding each of the plurality of quantized steams using a variable-length encoding algorithm to generate a corresponding plurality of the encoded streams.

3. The processor of claim 2, wherein the processor is further configured to:
   determine an encoded bit rate for each of the plurality of encoded streams;
   store the selected one of the encoded streams in a buffer in preparation for transmission; and,
   wherein the predetermined selection criterion is based on the encoded bit rates; and
   wherein the control signal is a buffer status signal indicative of the status of the buffer after receiving the selected one of the encoded streams.

4. The processor of claim 2, wherein the variable length encoding algorithm comprises Huffman coding.

5. The processor of claim 2, wherein the variable length encoding algorithm comprises run-length encoding of zeros followed by Huffman coding.

6. The processor of claim 3, wherein each of the quantization settings is a weighting mask function generated in accordance with a quantization index.

7. The processor of claim 2, wherein the processor is further configured to receive pixel data and perform a discrete cosine transform (DCT) operation on a segment of the pixel data to generate a block of DCT coefficients being associated with the segment of the video signal.

8. An apparatus for adaptively controlling an encoded bit rate of a video input for image compression, comprising:
 an encoder for encoding a segment of video signal in accordance with a predetermined set of quantization settings to generate a plurality of encoded streams of data bits;
 a selector for selecting one of the encoded streams in accordance with a predetermined selection algorithm based on a bit rate;
 a generator for generating a control signal based on the selected tone of the encoded Streams; and
 an updater for updating the quantization settings in accordance with the control signal.

9. The apparatus of claim 8, wherein the encoder:
 quantizes the segment of video signal to generate a plurality of quantized streams, each of the plurality of quantized streams being quantized according to one of the quantization settings; and
 variable-length encodes each of the plurality of quantized streams using a variable-length encoding algorithm to generate a corresponding plurality of the encoded streams.

10. The apparatus of claim 9, further comprising:
 a determiner for determining an encoded bit rate for each of the plurality of encoded streams;
 a buffer for storing the selected one of the encoded streams in the buffer in preparation for transmission; and
 wherein the predetermined selection criterion is based on the encoded bit rates; and
 wherein the control signal is a buffer status signal indicative of the status of the buffer after receiving the selected one of the encoded streams.

11. The apparatus of claim 9, wherein the variable length encoding algorithm comprises Huffman coding.

12. The apparatus of claim 9, wherein the variable length encoding algorithm comprises run-length encoding of zeros followed by Huffman coding.

13. The apparatus of claim 10, wherein each of the quantization settings is a weighting mask function generated in accordance with a quantization index.

14. The apparatus of claim 9, further comprising a receiver for receiving pixel data and a transformer for performing a discrete cosine transform (DCT) operation on a segment of the pixel data to generate a block of DCT coefficients being associated with the segment of the video signal.

15. An apparatus for adaptively controlling an encoded bit rate of a video input for image compression, comprising:
 means for encoding a segment of video signal in accordance with a predetermined set of quantization settings to generate a plurality of encoded streams of data bits;
 means for selecting one of the encoded streams in accordance with a predetermined selection algorithm based on a bit rate;
 means for generating a control signal based on the selected one of the encoded streams; and
 means for updating the quantization settings in accordance with the control signal.

16. The apparatus of claim 15, wherein the means for encoding:
 quantizes the segment of video signal to generate a plurality of quantized streams, each of the plurality of quantized streams being quantized according to one of the quantization settings; and
 variable-length encodes each of the plurality of quantized streams using a variable-length encoding algorithm to generate a corresponding plurality of the encoded streams.

17. The apparatus of 16, further comprising:
 means for determining an encoded bit rate for each of the plurality of encoded streams;
 means for storing the selected one of the encoded streams in a buffer in preparation for transmission; and
 wherein the predetermined selection criterion is based on the encoded bit rates; and
 wherein the control signal is a buffer status signal indicative of the status of the buffer after receiving the selected one of the encoded streams.

18. The apparatus of claim 16, wherein the variable length encoding algorithm comprises Huffman coding.

19. The apparatus of claim 16, wherein the variable length encoding algorithm comprises run-length encoding of zeros followed by Huffman coding.

20. The apparatus of claim 17, wherein each of the quantization settings is a weighting mask function generated in accordance with a quantization index.

21. The apparatus of claim 16, further comprising means for receiving pixel data and means for performing a discrete cosine transform (DCT) operation on a segment of the pixel data to generate a block of DCT coefficients being associated with the segment of the video signal.

22. A processor for adaptively controlling an encoded bit rate of a video input for image compression, said processor being configured to:
 encode a segment of video in accordance with a predetermined set of quantization settings to generate a plurality of encoded streams of data bits;
 determine a bit rate corresponding to each of the plurality of encoded streams; and
 select one of the encoded streams in accordance with a predetermined selection algorithm based on the-bit rates corresponding to the plurality of encoded streams.

23. An apparatus for adaptively controlling an encoded bit rate of a video input for image compression, comprising:
 an encoder for encoding a segment of video in accordance with a predetermined set of quantization settings to generate a plurality of encoded streams of data bits;
 a determiner for determining a bit rate corresponding to each of the plurality of encoded streams; and
 a selector for selecting one of the encoded streams in accordance with a predetermined selection algorithm based on the bit rates corresponding to the plurality of encoded streams.

24. An apparatus for adaptively controlling an encoded bit rate of a video input for image compression, comprising:
 means for encoding a segment of video in accordance with a predetermined set of quantization settings to generate a plurality of encoded streams of data bits;
 means for determining a bit rate corresponding to each of the plurality of encoded streams; and
 means for selecting one of the encoded streams in accordance with a predetermined selection algorithm based on the bit rates corresponding to the plurality of encoded streams.

25. In an image compression system, a method for controlling an encoded bit rate of a video signal, comprising:
 using a computer or processor to perform the steps of:
 receiving a segment of video signal and generating a plurality of encoded streams of data bits and corresponding bit rates; and receiving the plurality of encoded streams and the corresponding bit rates;
receiving the bit rates and comparing the bit rates with a target bit rate; and
receiving the plurality of encoded streams and selecting one of the plurality of encoded streams based on the results of the comparison.

26. The method of claim 25, wherein receiving the segment of video segment further comprises generating the plurality of encoded streams of data bits in accordance with predetermined set of quantization indices and further wherein receiving the plurality of encoded streams and the corresponding bit rates further comprises:
deriving model of bit rate versus quantization index;
using a computer or processor to perform the steps of:
deriving an updated target bit rate; and
deriving an updated set of quantization indices for a next segment of video signal based on the updated target bit rate and model of bit rate versus quantization index.

27. In an image compression system, a processor for controlling an encoded bit rate of a video signal, said processor being configured to:
receive a segment of video signal and generating a plurality of encoded streams of data bits and corresponding bit rates; and
receive the plurality of encoded streams and the corresponding bit rates;
receive the bit rates and compare the bit rates with a target bit rate; and
receive the plurality of encoded streams and select one of the plurality of encoded streams based on the results of the comparison.

28. The processor of claim 27, further configured to:
generate the plurality of encoded streams of data bits in accordance with predetermined set of quantization indices;
derive model of bit rate versus quantization index;
derive an updated target bit rate; and
derive an updated set of quantization indices for a next segment of video signal based on the updated target bit rate and model of bit rate versus quantization index.

29. In an image compression system, an apparatus for controlling an encoded bit rate of a video signal, comprising:
a first receiver for receiving a segment of video signal and a generator for generating a plurality of encoded streams of data bits and corresponding bit rates; and
a second receiver, for receiving the plurality of encoded streams and the corresponding bit rates;
a third receiver for receiving the bit-rates and a comparator for comparing the bit rates with a target bit rate; and
a fourth receiver for receiving the plurality of encoded streams and a selector for selecting one of the plurality of encoded streams based on the results of the comparison.

30. In an image compression system, a method for controlling an encoded bit rate of a video signal, comprising:
using a computer or processor to perform the steps of:
receiving a plurality of segments of video signal;
receiving a plurality of encoded streams;
quantizing at least one of the segments of the video signal in accordance with a predetermined quantization index;
encoding one of the at least one quantized segment of video to generate a plurality of encoded streams of data bits;
generating a selected encoded stream in accordance with predetermined selection algorithm; and
buffering the selected encoded stream in preparation for transmission.

31. In an image compression system, a processor for controlling an encoded bit rate of a video signal, said processor being configured to:
receive a plurality of segments of video signal;
receive a plurality of encoded streams;
quantize at least one of the segments of video signal in accordance with a predetermined quantization index;
encode one of the at least one quantized segment of video to generate a plurality of encoded streams of data bits;
generate a selected encoded stream in accordance with predetermined selection algorithm; and
buffer the selected encoded stream in preparation for transmission.

32. In an image compression system, an apparatus for controlling an encoded bit rate of a video signal, comprising:
a first receiver for receiving a plurality of segments of video signal;
a second receiver for receiving a plurality of encoded streams;
a quantizer for quantizing at least one of the segments of video signal in accordance with a predetermined quantization index;
an encoder for encoding one of the at least one quantized segment of video to generate a Plurality of encoded streams of data bits;
a generator for generating a selected encoded stream in accordance with predetermined selection algorithm; and
a buffer for storing the selected encoded stream in preparation for transmission.

33. A method for adaptively controlling an encoded bit rate of a video input for image compression, said method comprising:
using a computer or processor to perform the steps of:
encoding a segment video signal in accordance with a predetermined set of quantization settings to generate a plurality of encoded streams of data bits;
selecting one of the encoded streams in accordance with a predetermined selection algorithm based on a bit rate;
generating a control signal based on the selected one of the encoded streams; and
updating the quantization settings in accordance with the control signal.

* * * * *